April 12, 1955   L. LINDBERG ET AL   2,706,248
SYSTEMS FOR MAGNETIC AND ELECTRIC ELECTRON FLOW CONTROL
Filed Feb. 13, 1950   8 Sheets-Sheet 1

Inventors
Lennart Lindberg
Jonas Björkman
Dag Åsnell
By Ralph B. Stewart
Attorney April 12, 1955   L. LINDBERG ET AL   2,706,248
SYSTEMS FOR MAGNETIC AND ELECTRIC ELECTRON FLOW CONTROL
Filed Feb. 13, 1950   8 Sheets-Sheet 3

Inventors
Lennart Lindberg
Jonas Björkman
Dag Romell
By Ralph B. Stewart
attorney April 12, 1955     L. LINDBERG ET AL     2,706,248
SYSTEMS FOR MAGNETIC AND ELECTRIC ELECTRON FLOW CONTROL
Filed Feb. 13, 1950     8 Sheets-Sheet 4

April 12, 1955  L. LINDBERG ET AL  2,706,248
SYSTEMS FOR MAGNETIC AND ELECTRIC ELECTRON FLOW CONTROL
Filed Feb. 13, 1950.  8 Sheets-Sheet 5

April 12, 1955     L. LINDBERG ET AL     2,706,248
SYSTEMS FOR MAGNETIC AND ELECTRIC ELECTRON FLOW CONTROL
Filed Feb. 13, 1950     8 Sheets-Sheet 6

April 12, 1955    L. LINDBERG ET AL    2,706,248
SYSTEMS FOR MAGNETIC AND ELECTRIC ELECTRON FLOW CONTROL
Filed Feb. 13, 1950                        8 Sheets-Sheet 7

Inventors
Lennart Lindberg
Jonas Bjorkman
Dag Romell
By Ralph B. Stewart
Attorney

United States Patent Office

2,706,248
Patented Apr. 12, 1955

2,706,248

SYSTEMS FOR MAGNETIC AND ELECTRIC ELECTRON FLOW CONTROL

Lennart Lindberg and Jonas Bjorkman, Stockholm, and Dag Romell, Djursholm, Sweden, assignors to Telefonaktiebolaget L. M. Ericsson, Stockholm, Sweden Application February 13, 1950, Serial No. 143,856

Claims priority, application Sweden February 12, 1949

7 Claims. (Cl. 250—27)

The present invention relates to a system for discharging electrons under the influence of an electric field prevailing in the discharge space and a magnetic field forming an angle to said electric field.

The invention has for its object to improve the operation of so called trochotrons and more particularly to render possible the conduction of a higher discharge current, a higher transconductance of the tube, and a more rapid switching than in the trochotrons as well as a simpler design of the tube.

According to one aspect of the invention said system has a cathode and a plurality of other electrodes, here called spades, at least two of said other electrodes or spades being arranged as acceleration anodes in respect of the emission from the cathode and associated with such connection elements that they may be each individually brought to a potential different from the remaining spades.

The system is differentiated from magnetrons, among other things, through the method of the interconnection of the electrodes. In the magnetrons each other electrode is interconnected so that two equivalent groups of electrodes are obtained whereas in the present system different potentials may be impressed upon the electrodes individually or the electrodes may be interconnected in groups in other manners than that which is characteristic for the magnetrons. The electrode groups may thus, by way of example, consist of electrodes having different mechanical dimensions or positioned at different distances from the cathode or, alternatively, there may be provided, in the interspaces between adjacent spades serving as acceleration anodes, a number of intermediate electrodes having a small or no influence on the electron emission.

According to another aspect of the invention the electrons are emitted between a cathode and a number of electrodes a plurality of said electrodes, here termed spades, being adapted to have a comparatively high penetration factor in respect of the cathode and to operate normally as acceleration anodes influencing the electron emission whereas other of said electrodes, here termed intermediate electrodes, are provided in the interspaces between the spades and have an insignificant or no penetration factor in respect of the cathode.

The present invention is differentiated from the trochotron, among other things, through the fact that a plurality of electrodes are adapted to operate at the same time or individually as substantially equivalent acceleration anodes. In the most important embodiments of the invention there are other values of the ratio between the magnetic and the electric fields than those occuring in the trochotrons. Said differences render it possible, among other things, to obtain, in a system according to the present invention, greater amperages and higher transconductances as well as higher switching rates than in the trochotrons. It further renders it possible to eliminate or reduce the influence of the leakage currents which have been found to occur as disturbances in certain fields of application.

The invention will be more closely described below with reference to the accompanying drawings on which Fig. 1 diagrammatically illustrates an embodiment.

Figure 1:
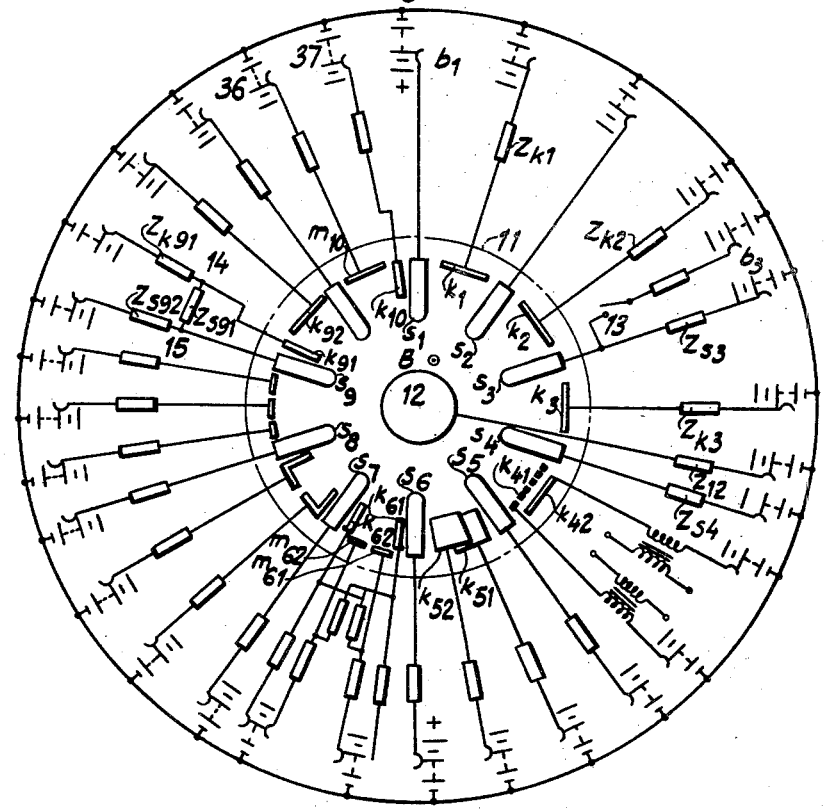
Figs. 1a and 1b show diagrammatically on a larger scale certain details of Fig. 1 as viewed radially from the cathode.
Figure 1A:
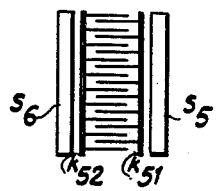
Figure 1B:
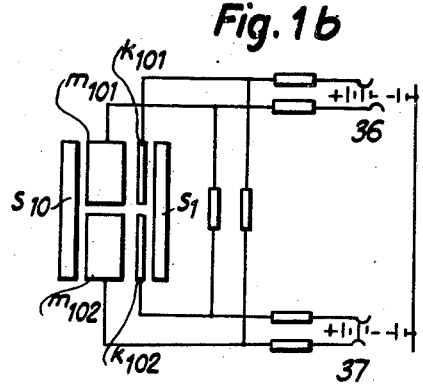

Fig. 1 is a spade arrangement having a rotary symmetry and being built up around a central cathode 12. The electrodes are enclosed in a vessel 11 being evacuated to a low pressure. This vessel is placed in a magnetic field symbolized by the letter B and the point within a circle indicating a direction against the observer's eye perpendicularly to the plane of the paper. Around the cathode 12 there are placed a number of electrodes $s_1$, $s_2$, $s_3$ etc. called spades which are normally connected to a positive voltage in relation to the cathode 12. Between the spades there are formed interspaces called boxes. In the boxes there is one or more intermediate electrodes designated $k_1$, $k_2$ etc. and adapted to receive electron discharge currents and normally connected to a voltage which is positive in relation to the cathode, via switching elements $z_{k1}$ etc. in which the discharge current is utilized.

If suitable values are selected in respect to the magnetic field B and the voltage of the spades the electrons emitted from the cathode and accelerated by positive voltage of the spades will be diverted through the action of the magnetic field so that they describe trochoidal paths. According to the theory of the trochotrons an electron describes a trochoidal path the mean line of which follows an equipotential line in the electric field as long as this is homogeneous. If all the spades have a sufficient high positive voltage the equipotential lines form closed circuits around the cathode and the electrons will not be received by the positive spades but form a space charge which prevents further electron output.

Through switching processes known per se in trochotrons the electrons emitted from the cathode are conducted to one or more arbitrary electrodes. Some main types of such switching processes will now be described.

If the positive voltage of one of the spades, such as $s_1$, is reduced, for instance, by setting the battery switch $b_1$ on a suitable voltage falling within the range of potential followed by the electron current, the electrons circling around the cathode will be deviated so that they strike the spade $s_1$. If the voltage of the spade is lowered to a voltage adjacent the potential of the cathode or below this the electron current will instead be conducted into the box between spades $s_1$ and $s_2$ where it is absorbed by reception electrodes provided in the box in this case the intermediate electrode $k_1$ wherefrom it is led off through the connection element $z_{k1}$ in which it is utilized. The electron current remains in this switching process on the spade $s_1$ or in the corresponding box as long as the proper voltage, impressed upon the spade, remains.

Another connection process is illustrated in the spade $s_3$. This is normally connected to a positive voltage through a connection element $z_{s3}$. If the electron current for a moment is brought to meet the spade $s_3$, for instance, through the supply of a momentary negative voltage pulse, by way of example, by a closure of short duration of the contact 13, the current from the spade will pass through the impedance $z_{s3}$ and cause a drop of voltage therein which results in the spade retaining its low voltage after the contact 13 has been broken. By a suitable dimensioning of the impedance $z_{s3}$ the drop of voltage in the spade $s_3$ will be so large that a portion of the electron current passes by on the side of the spade into the box between the spades $s_3$ and $s_4$ in which it is absorbed and utilized by the electrode $k_3$. The electron current is in this switching process self-locking, i. e. it remains also after the ceasing of the directing voltage pulse.

As in the trochotrons the connection elements in series with spades and intermediate electrodes may be so dimensioned that the electron current is automatically switched over to the adjacent electrode and therefrom in turn to the next one etc. In this way an automatic switching process is established in which the electron current without the supply of external impulses is moved from one electrode to another. In a tube of circular structure a cyclic operation may thus be obtained in which the electron current rotates stepwise in the tube until it is stopped through anyone of the measures known in the trochotrons. The velocity of rotation is determined by the time constants of the connection elements associated with the electrodes and of the supplied voltages thereof.

As in the trochotrons the electron current may be used for closing or altering the current in a circuit connected to other electrodes than the cathode. Its action may then be so described that it establishes a contact closing with a certain contact resistance in an outer circuit connected to two contact electrodes provided in the tube. The contact space may be passed by current variations in both directions. Two such cooperating contact electrodes are termed a pair of contacts and the electron current may influence at the same time one or more pair of contacts positioned in the same or in different boxes.

A pair of contacts may consist of a plate and a grid in front thereof as illustrated with the references $k_{41}$ and $k_{42}$ in Fig. 1 or at least two plates or groups of plates as illustrated in the boxes adjacent the spades $s_5$, $s_6$, $s_7$ and $s_8$ in Fig. 1 or may be designed in a special way to obtain a low mutual impedance. In the box between the spades $s_5$ and $s_6$, of which Fig. 1$a$ is a detail projection as viewed from the cathode, the electrons are diverted in parallel with the magnetic field between the contact electrodes $k_{51}$ and $k_{52}$. Such forms have been previously proposed in the trochotrons.

In an electrode arrangement as illustrated in the box between the spades $s_6$ and $s_7$ in Fig. 1 it is also possible to obtain such conditions that an increase of voltage of an electrode or electrode group results in an increase of the current to the other electrode group in the pair of contacts. The operation may be explained most simply if it is assumed that the electrode voltages are so adjusted that the major portion of the current is flowing to the electrodes $m_{61}$ and $m_{62}$ and is distributed rather equally on said electrodes. An increase of the voltage of the electrode $k_{62}$ results in increase of the current to the electrode $m_{62}$ and a corresponding reduction of the current to the electrode $m_{61}$ whereas an increase of the voltage of the electrode $k_{61}$ has the opposite effect. Under these circumstances the combinations of electrodes $k_{61}$ and $m_{62}$ or $k_{62}$ and $m_{61}$ respectively will afford negative differential resistances which renders it possible, among other things, to transfer direct current effect from the voltage sources of the device to an alternating current effect in the impedances connected thereto. This may be utilized for amplification purposes, the generation of oscillations etcetera.

Similar conditions may be realized in electrode arrangements resembling the intermediate electrodes $m_{10}$ and $k_{10}$ in Fig. 1 if the feed voltages are so selected that the by-spade $k_{10}$ operates along that portion of its characteristic of dynatron type which has a negative inclination. Mutual properties may be obtained thereby if said electrodes are divided, in their extension in the direction of the magnetic field, into sections which are interconnected crosswise. This is shown in Fig. 1$b$ which is a detail view of a box as viewed from the cathode and in which electrodes resembling those in the box 10, Fig. 1, have been subdivided in the manner above stated into an upper pair $m_{101}$, $k_{101}$ and a lower pair $m_{102}$ and $k_{102}$. The sections $k_{101}$ and $m_{102}$ as well as $k_{102}$ and $m_{101}$ thus obtained are interconnected via impedances.

Experiments with contact electrodes in trochotrons have not led to practically useful solutions because the impedances obtainable have been too high for most purposes, by way of example, for telephone selectors in spite of the fact that secondary emission effects of the electrodes have been utilized. In combining said contact pairs known per se with an electron discharge device according to the present invention there is obtained between the electrodes included in the contact pairs an impedance of a substantially lower order of size which renders the device useful in practical applications. For most purposes the impedance will be sufficiently low without using secondary emission effects.

An electron discharge device carried out as above described affords a higher ratio between output amperage and impressed voltage than the trochotrons, among other things, depending thereon that the electrons exist in the discharge space a very short time. The mechanical structure will be simple and affords an efficient utilisation of the magnetic field whether this is established by means of a permanent magnet or an electromagnet. The electron beam may be brought to rotate cyclically over the electrodes without having recourse to any special restoring device as in straight trochotrons. As the frequency of the rotation of the latter often is restricted by the time constants of the restoration device a higher step frequency may be obtained in the closed tube according to the present invention.

Further an electron discharge device according to the invention is suitable for a subdivision of the electrode current into two or more parts which may be directed to different receiving electrodes. If, for instance, in Fig. 1 the voltage is lowered on the spades $s_1$, $s_4$ and $s_7$ the electron current will be divided into three parts, of which the one enters the box between the spades $s_1$ and $s_2$, the second enters the box between spades $s_4$ and $s_5$ and the third part enters the box between spades $s_7$ and $s_8$ each part being absorbed by reception electrodes being provided in the appertaining boxes.

If magnetic field, electric voltage and mechanical dimensions in an electron discharge device of the type described above are selected according to the rules applicable in trochotrons and similar tubes the diameter of the revolving movement of the electrons caused by the magnetic field will be small in relation to the distance between the cathode and the spades. A trochoidal beam generated in a manner hitherto usual will include electrons having different kinetic energy and they will thus follow different equipotential levels whereby the electron beam obtains a width exceeding the diameter of the revolving movement. It has further been found that if the amperage in the trochoidal ray exceeds certain comparatively low amplitudes the trochoidal movement is gradually degenerated so that the beam will include electrons having higher and lower energy than in those electrons which originally were present in the beam. This causes electron currents which divert from the main discharge current and may go to the other electrodes than the main current.

Figure 2:
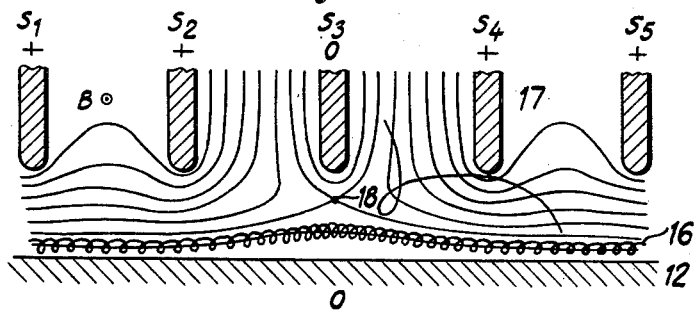
Figs. 2 to 4 show the course of the electric field under different conditions.

Fig. 2 illustrates diagrammatically the control action of a spade upon the electron current in an electron discharge device according to the invention in two typical cases which differ from one another since the magnetic field in the one case is considerably stronger than in the other. The cathode 12 is here pictured as a plane disk and the spades $s_1$, $s_2$, ... $s_5$ are placed in a row parallel with said disk (this embodiment may be used also in practice and differs from the trochotrons since the cathode has an extension covering several spades). The thin lines in Fig. 2 indicate electrical equipotential surfaces extending perpendicularly to the plane of the paper. A magnetic field being also perpendicular to the paper and symbolized with the character B is imagined to penetrate the discharge space. The trochoidal curves 16 and 17 represent electron paths.

In Fig. 2 the spades $s_1$, $s_2$, $s_4$ and $s_5$ have positive potential whereas the spade $s_3$ has the same potential as the cathode.

Due to the influence from neighbouring positive spades the potential between the spade $s_3$ and the cathode rises from zero value at the surfaces of the two electrodes towards a maximum value in a point 18 somewhere between said two electrodes. On the cathode side of this point the equipotential lines are passing unbroken along the cathode and along said lines also trochoidal beams of low energy may pass-by the controlling spade $s_3$, for instance, along a path 16 which is typical for the first case having a comparatively intense magnetic field. The electrons in said beams describe thus a very long path and remain for a long time in the discharge space a redistribution of energy here termed degeneration then gradually occurring. Said electrons may gradually be taken up by other electrodes and may there cause nondesirable currents.

Figure 3:
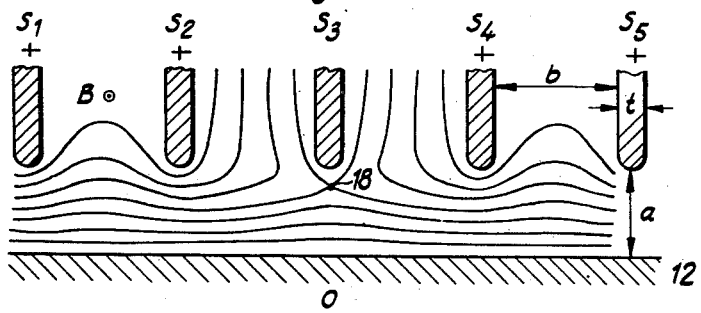

Fig. 3 illustrates corresponding conditions in case the spade $s_3$ is self-locking, i. e., is retained at a low potential by taking up a part of the electron current causing a drop of voltage in an impedance series connected with the spade $s_3$. The spade $s_3$ is in this case positive in relation to the cathode. The positive potential maximum in the space between the spade $s_3$ and the cathode will be farther from the cathode and have a higher potential. The conditions for the occurrence of leakage currents under the spade is in this case more favorable than in the preceding case.

To avoid the phenomena above described in such circuits where they are not desirable further embodiments of the invention have been developed. It has then been found that the possibility of obtaining high amperages through the tube is greatly increased if the arcurate movements of the electrons are made as large as possible. This appears to depend thereon that in expanding the paths that range is expanded within which there is a space charge and the distribution of the electric field is altered in such a manner that that progressive velocity of the space charge, at which the electrons are carried away, is essentially increased. To obtain electron arcs as large as possible the discharge device is made for weaker magnetic fields than in previously described embodiments. Through the reduction of the magnetic field a further increase of the velocity of progression is obtained because this is inversely proportional to the magnetic induction and directly proportional to the electric field intensity in the upper boundary surface of the space charge.

The curve 17 in Fig. 2 illustrates the second case with a large electron path in a comparatively weak magnetic field. When the dimensions of the path are increased the amplitude of that electron current is rapidly reduced which may pass underneath a potential maximum formed under a spade carrying a reduced potential said amplitude becoming zero at a certain critical value of the path dimensions. This occurs earlier the greater is the electrostatic penetration factor valid between the spade and cathode because the value of the potential maximum between spade and cathode is then less and the maximum point closer to the cathode. For this reason it is often desirable that the spades have as large penetration factor in relation to the cathode as possible.

The penetration factor of a spade in respect of the cathode refers in this connection to a geometrically defined quantity indicating the electrostatic action of a spade on that part of the cathode which is adjacent the spade.

(Compare the expression "penetration factor" with the German word "Durchgriff," for instance, in Rothe-Kleen: Grundlagen und Kennlinien der Elektronenröhren, Kap. IX, §5. Zweite Leipzig 1943. Ann Arbor, Michigan 1944.)

Figure 7:
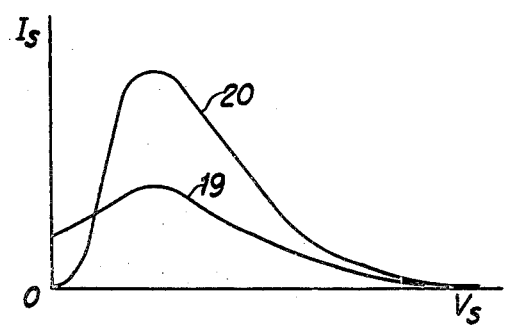
Fig. 7 illustrates the relation between the voltage and the amperage of the spades.

Because the course of the discharge thus is highly dependant on the intensity of the magnetic field the amperage-voltage-characteristics of the spades are altered with said intensity. Fig. 7 is a diagram illustrating this condition. The abscissa refers to the potential $V_s$ of a spade in relation to the cathode and the ordinate to the current $I_s$ received by the same electrode. The characteristics will follow a course resembling curve 20 in a weak magnetic field whereas characteristics resembling curve 19 will be obtained for the same electrode if the magnetic field is stronger. A marked difference between said two types of characteristics resides therein since in the former case, as in curve 20, the current to the spade is practically zero when the voltage of the spade is zero, i. e. equal to that of the cathode. Only after the spade has received a certain positive potential a powerful current will begin to flow thereto. In the latter case, as in the curve 19, a considerable electron current will reach the spade even when this is at cathode potential. This appears to depend thereon, among other things, that a portion of the electrons will pass-by under the controlling spade and remain for a long time in the magnetic field a degeneration of the electron paths being then created as above mentioned. A result of the degeneration is, for instance, that the electrons will strike electrodes which have a lower potential than the cathode and is further accompanied by a strong noise.

If a spade is at zero potential and the magnetic field is gradually reduced from a value which is so high that the current to the spade in question constitutes a not insignificant part of the diverted electron current, the spade current will decrease and eventually reach such a low value that it is of no importance for the usual switching arrangements. On the other hand, the magnetic field must not be too weak because currents then begin to flow to those spades which have acceleration potential.

To obtain a range of tolerance as large as possible for the magnetic field intensity between said limits whenever the above phenomena are disturbing, the penetration factor of each spade in respect of the cathode is increased as far as possible. This is done by reducing the distance $a$, Figs. 3 and 5, between the cathode and the most adjacent parts of the spades. Said distance should under such conditions be small in relation to the extension of the cathode in the direction of the progressive movement.

In certain cases it may be of advantage to make the openings of the boxes comparatively large, among other things, in view of the desideratum to reduce or avoid leakage current to the positive spade when the adjacent box receives current. The least free distance $b$ between the lateral surfaces of adjacent spades, compare Figs. 3 and 5, may thus be selected equal to or larger than the above mentioned distance $a$.

Several embodiments of the discharge device require thus a certain ratio between electric and magnetic field intensity even if it is possible to obtain, through a suitable geometrical shaping of the discharge tube, a ratio which becomes comparatively less critical. In practice it often occurs, however, that the feeding voltages vary while the discharge device may be adapted, in order to make it reliable, to stabilize automatically the ratio between electric and magnetic field intensity. It is then possible to make use of the fact that the emitted current varies strongly with said ratio, and, for instance, the drop of voltage in an impedance included in the cathode line, such as the detail $z_c$ in Fig. 1, may be made to correct the electrical field intensity in the discharge space. If said field intensity is increased the emission is increased, the drop of voltage in the impedance $z_c$ then increasing and tending to reduce the field intensity. As will be more closely described below the magnetic field intensity may instead be corrected by passing the emitted current or a portion thereof through a compensation coil the magnetic field of which acts on the main field.

The useful electron current appears substantially to consist of electrons emitted within the range of that path cycle which, as counted in the progressive direction of the current, is next before that box in which the electron current is taken up. Theoretically this range has in a plane cathode arrangement an extension of at most $a \cdot \pi$ if the action of the space charge is neglected, i. e., pure cycloidal paths are presupposed. As, however, the space charge plays a great role in practice its action cannot be neglected. In this case it has the influence that the length of the arcs becomes larger although they probably will be at most twice as long as in the cycloid case. The cathode should accordingly, from this point of view, have an extension in the progressive direction which exceeds $a \cdot \pi$ or preferably $2a \cdot \pi$. In tubes of circular arrangement the conditions will be more complicated. In practice it has, however, been proved that the ratio between the diameter $d$ of the cylindrical cathode and the distance $a$ should be larger than 0.8 and preferably fall between 1 and 3. In certain designs this requires that the cathode must have a comparatively large surface. The efficient cathode surface may, furthermore, be increased by introducing a virtual cathode which will be more closely described below.

In order to impart to the majority of the electrons such paths as will take up the major portion of the distance between the cathode and the spades the electric field in the space between the cathode and the spades should be as uniform as possible at the same time as the penetration factor of the spades in respect of the cathode should be high. This may be reached by another shaping of the spades than that hitherto used. In hitherto known embodiments of the trochotrons the spades extend substantially in a direction which is perpendicular to the normal path of the trochoidal current said spades facing said path with a narrow edge which may be rounded. In tubes with circular arrangement said edge is often V-shaped having the legs directed substantially radially out from the centre whereby the boxes obtain parallel lateral walls.

Figure 5:
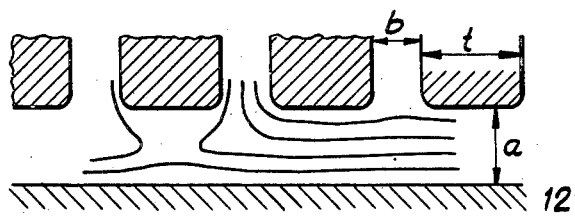
Figs. 5 and 6 show different principal arrangements of the spades.

An improvement of the electrical field distribution in the space between the spades and the cathode and an increase of the penetration factor of the spades may be obtained by increasing the surface with which the spades are facing the cathode. Fig. 5 shows an embodiment in which this is obtained by providing that portion of the spades which faces the cathode with a larger surface substantially parallel with the cathode surface. It has been proved that the extension $t$ of the spade surface facing the cathode, as counted perpendicularly to the magnetic field and in parallel with the cathode, should for this purpose exceed a quarter of the distance $a$ between the cathode and the parts of the spades most adjacent the cathode. Preferably the ratio $t/a$ should have values between ⅓ and 1.

Figure 6:
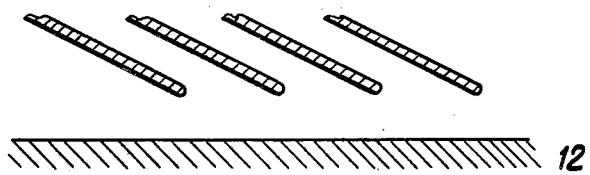

Fig. 6 shows another embodiment in which the spades $s_1$ et cetera are so arranged that they overlap one another. The boxes falling between the spades will then form an oblique angle in relation to the cathode surface. This angle may have either substantially the same direction as that of the progressive movement of the electron current or the opposed direction. By varying the inclination of the spades one may vary the current-voltage characteristics of the spades so that a greater inclination gives a higher and steeper characteristic.

Figure 8A:
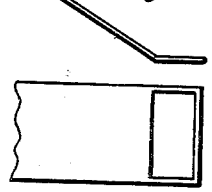
Figs. 8a to 8d show different embodiments of the spades.
Figure 8B:
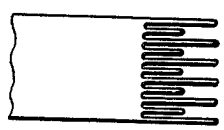
Figure 8C:
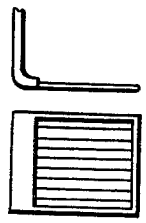
Figure 8D:
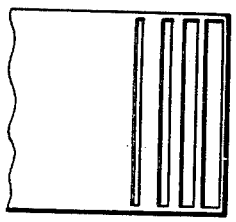

Figs. 8a, 8b, 8c and 8d show further embodiments in which the spade $s$ is provided with an additional element in the form of a grid according to Fig. 8c, a yoke according to Fig. 8a, a plurality of projections according to Fig. 8b or a similar design having recesses as indicated in Fig. 8d letting through the electron current partially. As long as the spade is positive said additional element contributes to the smoothing of the field between the spades and the cathode at the same time as a considerable penetration factor is maintained.

In the embodiments of the invention now described in which the electron paths are large the electric field intensity is subjected to great variations within that range which is covered by a path cycle or even a fraction thereof. Under such circumstances the approximate theory used to determine the diversion of the electron current in the trochotrons is not quite satisfactory but a more electronic-optical way of consideration must be applied. This results substantially in an alteration of the electron paths in the same direction as that according to the approximate theory but the alterations will be greater than according to the latter theory and more dependent on the form of the electrodes. The embodiments of the spades illustrated in Figs. 8a, 8b, 8c and 8d may be used for correcting the form of the electric field in certain points so that the electron current is conducted better into the reception box.

Figure 4:
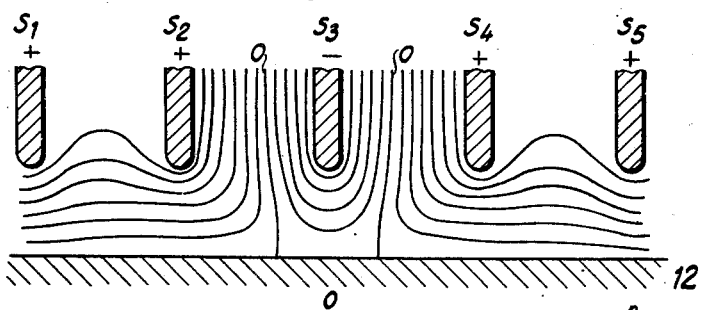

In the embodiments hitherto described the potential underneath a controlling spade has not been reduceable to the cathode potential. A more efficient potential barrier may be obtained by reducing the spade potential to values falling below the cathode voltage. Fig. 4 illustrates the course of the equipotential lines in such a case. The method is indicated in Fig. 1 where the control voltage for the spade $s_1$ may be taken off by means of the adjusting contact $b_1$ from a portion of the source of voltage which is negative in relation to the cathode. The same potential barrier may be provided also in self-locking spades, i. e. in that case when the electron current through its own action is retained in that box into which it has been brought. In such a case the negative potential may be supplied to the spade from those impedances or other connecting elements which are associated with the spade or the electrodes being the corresponding box. In Fig. 1 the spade $s_9$ has been shown as provided with such connection arrangement. As long as the electron current should not be introduced into the box belonging to this spade the latter will receive from the potentiometer $z_{s92}$—$z_{s91}$—$z_{k91}$ the same positive voltage as the remaining spades in the normal condition. If the electron current somehow, as above described, is brought to strike the spade $s_9$ a part of the current will be carried away through said impedances which causes a reduction of the potential of the spade. At suitable values of the impedances the reduction of voltage will be so great that only a part of the electron current is absorbed by the spade $s_9$ whereas the remainder continues into the box between the spade $s_9$ and the spade $s_{10}$. It is absorbed there entirely or partially by the electrode $k_{91}$. From this electrode the current is conducted to the impedance network $z_{k91}$—$z_{s91}$—$z_{s92}$ and causes then a further reduction of voltage in the points 14 and 15. If the impedances included in the potentiometer are suitably selected the spade $s_9$ connected to point 15 will receive a voltage which is lower than the potential of the cathode. The electron current then leaves the spade and continues in its entirety to the remaining electrodes in the box the electrode $k_{91}$ then still receiving such a great part of the electron current which is necessary for maintaining the low potential of the spade. This connection may be varied in different ways the essential point being that the reduction in voltage of the spade is brought about by connection elements passed by the electron current.

Also the magnetic field may be so arranged that it contributes to the increase of the upper limit for the amperage of the electron beam. If the magnetic field intensity is made higher in that range which closely surrounds the points of the spades certain electrons which have a somewhat higher kinetic energy than the average electrons will describe so large arcs in a homogeneous magnetic field that they strike anyone of the spades carrying positive voltage, and when such electrons penetrate into the amplified magnetic field in the neighbourhood of the spade point they will be more diverted than the remaining ones so that they return to lower potentials. This admits a further increase of the height of the path without any appreciable part of the electron current being absorbed by the positive spades.

By giving to the part of the magnetic field passing through that range in which spades and other electrodes are positioned, another intensity than in that range which is between the cathode and the spade portions being closest to the cathode, it is also possible to give another character to the electron current after it has been conducted into anyone of the boxes. If the magnetic field is made stronger the diameter in the revolving movement of the electrons will be less and thereby the electron beam thinner which may render possible, among other things, a reduction of the dimensions of the boxes.

As above stated the alteration in the electric field is large when the electrons describe large arcs in that range where the electrons are diverted towards any box. Said alteration is thus not negligible within a range which corresponds to the dimensions of an arc. The electrons are thus generally not deviated with an unvariable type of path as is the case in the trochotrons. In the diversion there is often an alteration of the character, potential level and arc dimensions of the path. Said alterations may be of different character and order of size depending thereon, at which point in the potential barrier the electron is diverted and may result in the electron beam in the box being composed by electrons having entirely different potential levels and path diameters. By a suitable disposition of the magnetic field the paths of the electrons entering the boxes at different points may be corrected so that a more uniform electron beam having a suitable diameter of path is obtained. A suitable disposition of such a magnetic field is preferably obtained by practical tests.

Figure 9:
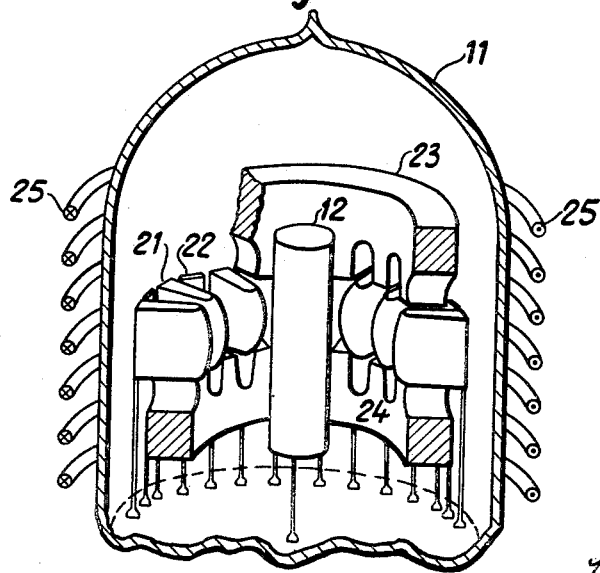
Fig. 9 is a perspective view of a special embodiment of a discharge device.

The distribution of the intensity of the magnetic field as above described may be established either through irregular winding of the magnet coils generating the fields or suitably shaped pole shoes of soft iron or magnetic steel. An embodiment of such pole shoes is shown in Fig. 9 being a section of an electron tube enclosed in an evacuated vessel 11 and consisting of a central cathode 12 surrounded by spades and intermediate electrodes as indicated by 21 and 22. A magnetic field is generated by a current carrying solenoid 25 and is concentrated by the steel rings 23 and 24 to the electrode boxes whereas the magnetic field is weaker in the space between the cathode and the spades. The magnetic field may also be generated by the rings 23 and 24 if they are of a permanent-magnetic material.

Figure 10:
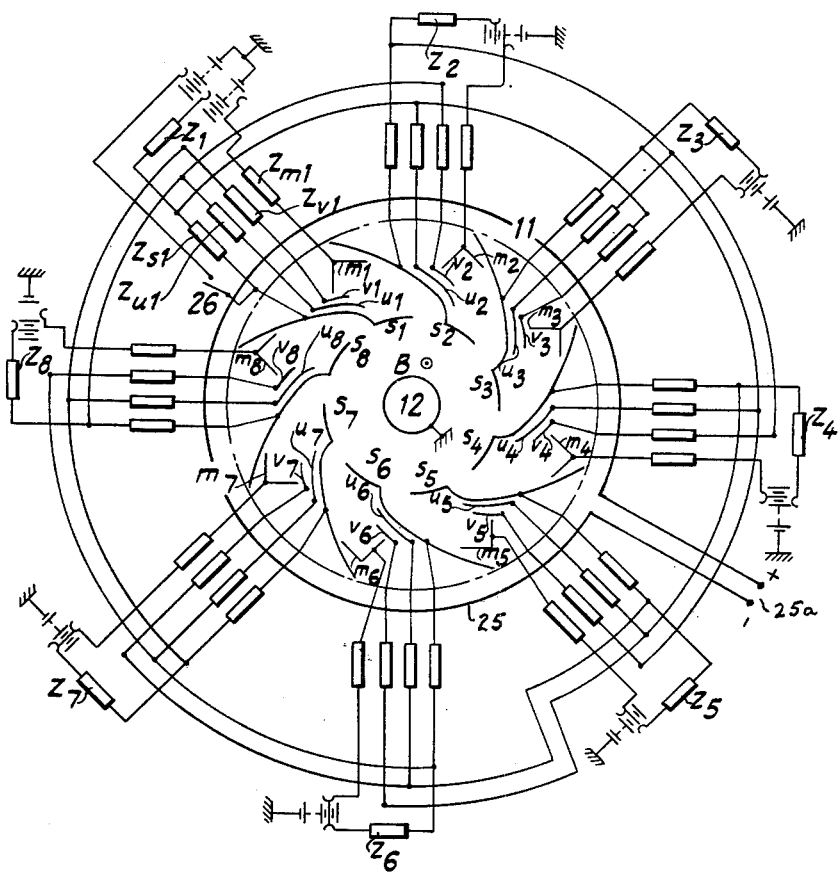
Fig. 10 illustrates diagrammatically another embodiment of the system in its entirety.

Other embodiments of the invention have been worked out which may be operated with a still weaker magnetic field. Fig. 10 is an example of such an embodiment. The spades $s_1, s_2, s_3 \ldots s_8$ are connected via impedances $z_1 \ldots z_8$ to a positive voltage in relation to the cathode. In each one of the boxes formed by the spades there are two catching electrodes $u_1 \ldots u_8$ and $v_1 \ldots v_8$ and other intermediate electrodes $m_1 \ldots m_8$ associated with voltage sources via impedances. The catching electrode $u_1$ is connected to the spade $s_8$ belonging to the next following box, as counted in the direction of propagation of the electron current, and to the catching electrode $v_2$ being in the next preceding box. The catching electrode $v_1$ is connected to the catching electrode $u_8$ in the next following box and the spade $s_7$ in the box then following. The tube is as before placed in a magnetic field the lines of force of which are perpendicular to the plane of the paper. As in Fig. 9, the magnetic field may be produced by a coil 25 surrounding envelope 11 and connected to an energizing circuit 25a. The magnetic field may be so weak that if all the spades were positive the electrons emitted from the cathode would describe so large paths that they would strike anyone of the spades before they reached the crest of the path.

If the electron current is guided to box 1, by way of example, through a temporary reduction of the potential of the spade $s_1$, as denoted in Fig. 10, by closing the contact 26 the current will be distributed between the spade $s_1$, and the catching electrodes $u_1$ and $v_1$ and, as the case may be, the remaining reception electrodes being in the box, those of box 1 being marked by $m_1$. The current is led off through the impedances $z_1$, $z_8$ and $z_7$ and drops in voltage caused thereby in said impedances cause a reduction of the voltage of the spades $s_1$, $s_8$ and $s_7$. The emission from those parts of the cathode which face said spades will then cease or be reduced to an insignificant value.

Electrons starting from such portions of the cathode which are closest to the spade $s_1$ will describe arcs which do not reach their maximum value before they strike the potential barrier between the spade $s_1$ and the cathode and are there reflected into the box at the spade $s_1$. The emission of electrons from those parts of the cathode which are so distant that the electron paths should have reached anyone of the positive electrodes before they reach the potential barrier, are suppressed by the reduction of voltage of the spades $s_7$ and $s_8$. The paths described by the electrons need thus not be complete trochoidal cycles.

Further impedances may be included in series with the spades and the catching electrodes as indicated with the impedances $z_{s1}$, $z_{u1}$ and $z_{v1}$ in Fig. 10. Hereby the voltages of the spades $s_7$ and $s_8$ may obtain such values that a certain emission may be caused from corresponding parts of the cathode whereby said electrons are given lower paths so that they, in spite of the great distance, reach the receiving box without touching the positive spades.

Such embodiments of the tube may advantageously be provided with cathodes having considerably less dimensions than those required in the previously described ones because the creation of a satisfactory potential barrier is here favoured by the fact that several spades have low tension at the same time.

The described connection is only an example of the inventive ideas which may be varied in different ways. The catching electrodes need not be interconnected with adjacent spades but may instead influence the voltage of special acceleration electrodes provided at the side of the spades. The voltages of such spades or corresponding spades may be derived from arbitrary switching elements passed by the current from one or more of those electrodes which belong to the box into which the electron current is guided. The electron current from one box may be brought to influence the voltage of all of or at least a great deal of the spades of the tube, and of the acceleration electrodes, if any, and give thereto such an individual distribution of voltage that electrons emitted from the entire cathode of the major portion thereof are brought to describe the desired paths, by way of example, so that they keep in the interspace between the cathode and the parts of the remaining electrodes facing the cathode without making contact with anyone thereof before they reach the controlling potential barrier. The arrangement may also be such that other conditions are complied with which one may lay down in respect to the electrode paths. One may thus, for instance, efficiently prevent the occurrence of non-desirable beams.

The switching arrangement now described may also be used, in the previously described embodiments of the invention, to amplify the control action of a spade and to prevent any parts of the electron current passing by the spade (as occurs in Fig. 2, path 16).

Instead of influencing the electrical field in different points of the tube the electron current from one box may be brought, via suitable connection elements, to alter the magnetic field through the tube in a suitable way, for instance, so that the electrons are forced into paths keeping within the interspace between the cathode and the other electrodes. The current from the connection elements is then conducted through parts of that coil which causes the magnetic field or through special compensation coils arranged in a manner known per se and adapted to alter the main field.

Figure 11:
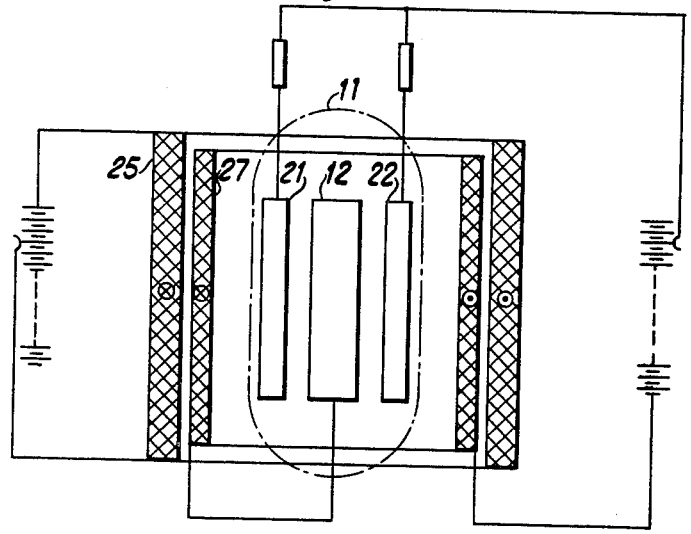
Fig. 11 shows another embodiment of the magnetic field arrangement.

A stabilisation of the magnetic field may easily be obtained if the cathode current is led through a compensation coil changing the main field so that, when the cathode current is increased, the magnetic field is increased. The latter tends in turn to reduce the emission whereby stabilisation is obtained. This is indicated in Fig. 11 showing a section on the axis of symmetry of a tube provided with two magnet coils. Of these the solenoid 25 generates the main field whereas the solenoid 27 is passed by the current from the cathode 12 the positive electrodes in the tube being indicated by 21 and 22.

The currents and voltages required to establish the described alterations in the electric or magnetic fields, need, of course, not originate from the electron current through the tube but may be supplied to the electron discharge device from the outside.

The surface of the cathode should be comparatively large in several of the described embodiments. It may then be suitable to divide the surface into several electron emitting surfaces or to compose it from several independent cathodes. To said parts there may also be given voltages differing from one another.

Figure 12:
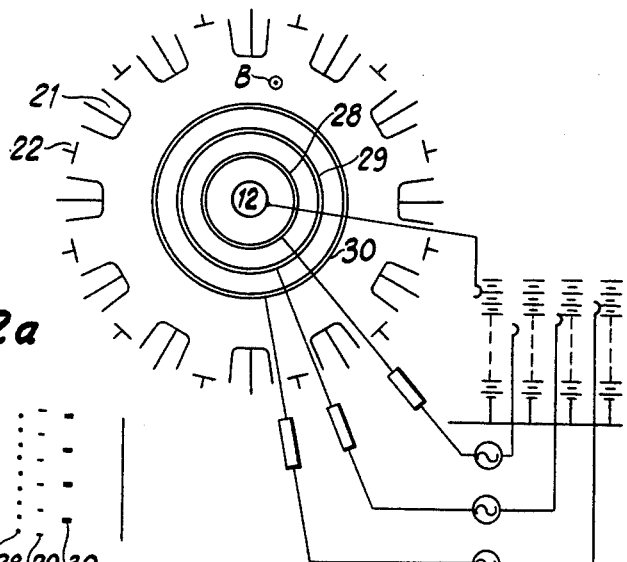
Figs. 12 and 12a illustrate in radial and axial projection respectively an embodiment of grid between the cathode and the spades.
Figure 12A:
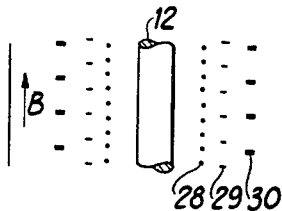

Certain embodiments of the invention are equipped with one or more grids positioned between the cathode and the other electrodes. By way of example, Fig. 12 shows a cross section perpendicularly to the magnetic field of a tube having three concentric grids 28, 29 and 30 encircling the cathode 12. Fig. 12a shows the same tube in a section along the magnetic field. The one of the two inner grids 28 or 29 may, for instance, be used in controlling and modulating the emission current. The second grid may then preferably serve as an acceleration anode. The acceleration grid may be positioned either inside or outside the control grid. It may also be composed by special acceleration anodes in the mouths of the boxes or between the boxes. Said anodes, may, of course, also have their separate feed lines. Further anyone of the grids may be placed in an immediate vicinity of the spades, for instance, in such a manner that it contributes to the smoothing-out of the inhomogenity of the electric field adjacent the box mouth.

Between the acceleration grid and the control grid or the outermost grid or the suppressor grid 30 there may be established a virtual cathode at suitable values of the operating voltages. The advantage of this arrangement is, among other things, that the virtual cathode, which may be considered as the starting points for the electrons, may obtain a larger surface than the real cathode and be placed at a suitable place in the interspace between the cathode and the spades.

Figure 13:
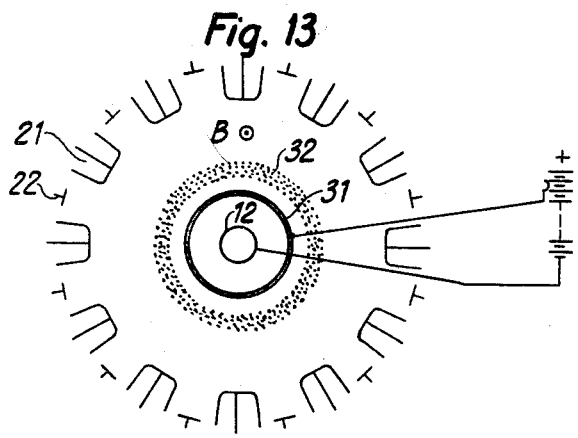
Fig. 13 illustrates a virtual cathode.
Figure 14:
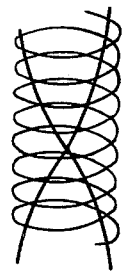
Fig. 14 is an embodiment of a grid.

Often one or more of the grids may be left out. For instance, the virtual cathode may be established without suppressor grid by the diverting action of the magnetic field as shown in Fig. 13 in which the cathode 12 is surrounded by the acceleration grid 31 which causes, in cooperation with the magnetic field B, a virtual cathode in the dotted zone 32.

Such tubes with grids may be made with considerably less cathode dimensions than in the above described embodiments, particularly when a virtual cathode is present.

A variation or modulation of the electron current through the tube may, as above described, be caused by a control grid but, as an alternative, it may be caused by altering the voltage between the cathode and the positive spades. Most simply this is made by a regulating impedance or a modulating electromotive force in the supply line to the cathode, compare the detail $z_{12}$ in Fig. 1.

Figure 15A:
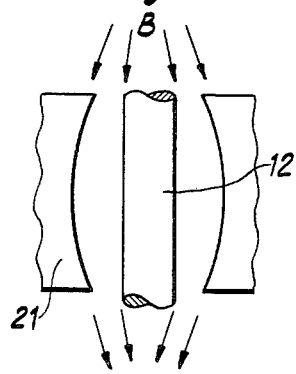
Figs. 15a and 15b illustrate in axial projection examples of the shapes of the spades.
Figure 15B:
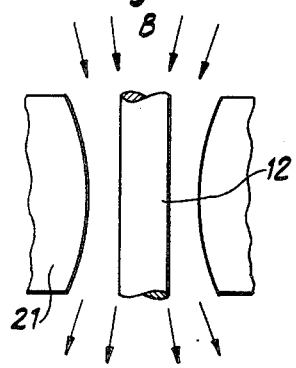
Figure 16A:
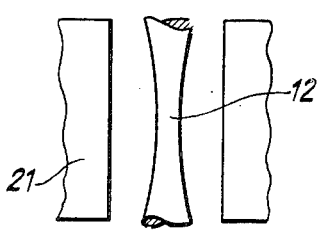
Figs. 16a and 16b illustrate in axial projection examples of the shape of the cathode.
Figure 16B:
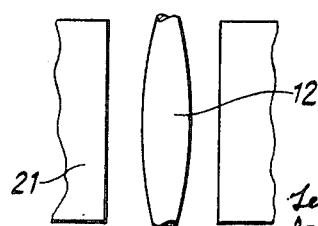
Figure 17:
Fig. 17 shows in perspective view another arrangement of the spades.
Figure 18:
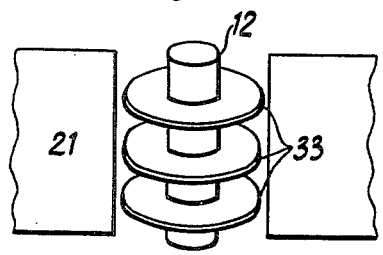
Fig. 18 is an embodiment of the discharge space.

In describing the invention the magnetic lines of force have been assumed to be parallel and perpendicular to the plane of the paper. In reality the magnetic lines of force are not straight lines in the passage through the tube but they are more or less arcuate inwards towards the cathode or outwards from the latter depending on the manner in which the magnetic field is generated. If the tube has to be operated with as large arcuate movements as possible it is preferable to compensate this curvature of the magnetic field by bending the spades as shown in Figs. 15a and 15b. The same result may be had by giving instead to the cathode a form deviating from the straight cylinder as indicated in Figs. 16a and 16b. In those cases when the magnetic field is most concentrated at the middle of the cathode and decreases towards both ends of the cathode a similar effect may also be obtained by giving to the spades a certain inclination in relation to the centre line of the cathode, compare Fig. 17. Such an inclination contributes also to an equalization of the form of the current-voltage-characteristics of the spades as is explained above.

The present invention is not restricted to the embodiments now described which may be varied and combined in many ways without going beyond the scope of the invention. Connections and control arrangements may be made in similarity with those known in trochotrons. It may particularly be pointed out that it is not necessary that the electrodes surrounding the cathode are arranged along a circle or not even that they form a closed ring. The cathode may be of any arbitrary form and the spades corresponding thereto may be placed in any arbitrary manner so that they have an electrostatic influence thereon. The connection elements associated with the electrodes are not, of course, necessarily linear passive impedances but may include arbitrary non-linear elements and also active such elements.

We claim:

1. An electron discharge device comprising in combination, an envelope containing a cylindrical emitter cathode, a plurality of spade electrodes adjacent said cathode in uniform spaced relation thereto and circumferentially spaced to provide a box between each pair of adjacent spades, at least one intermediate electrode located in each box and more remote from the cathode than portions of the spade electrodes, means establishing a magnetic field within the boxes and spaces between the cathode and other electrodes, the lines of force of said field being substantially parallel with the axis of said cathode, whereby trochoidal electron current flow occurs in the space between the cathode and the spades, and means for applying a similar positive potential to all of said spades with respect to said cathode, means for momentarily lowering the potential of one spade to deflect the electron current into the box ahead of said spade in the direction of electron flow, means connecting each one of said intermediate electrodes to one following spade, and means responsive to current flow through said intermediate electrodes to lower the potential thereof and of said connected following spade.

2. An arrangement as claimed in claim 1 and including a second intermediate electrode in each box, and means connecting said second intermediate electrode to a first intermediate electrode in the following box and to at least one spade defining the second box following the box of said second intermediate electrode, whereby the potentials of the interconnected first and second intermediate electrodes and of the latter spade will vary with one another.

3. An arrangement as claimed in claim 1 in which at least two intermediate electrodes are provided in the interspace between adjacent spades, and including means providing a potential difference between said intermediate electrodes from outside of said envelope whereby to distribute between the intermediate electrodes the electron current entering said interspace.

4. An arrangement as claimed in claim 1, in which the intermediate electrodes are arranged in a first group positioned farther from the cathode and a second group arranged closer to the cathode, and potential distributing means therefor causing said second group of intermediate electrodes to serve to control the distribution of the electron current on the first group of intermediate electrodes.

5. An arrangement as claimed in claim 1 in which the operative surfaces of the spades, as viewed in a plane perpendicular to the magnetic field, are arranged in oblique relation to the operative surface of the cathode so that the distance between points on the surfaces of the spades and the nearest point of the cathode surface increases in the one direction along the surface of the cathode.

6. The arrangement as defined in claim 1 in which the operative surfaces of the spades as projected onto a plane normal to the magnetic field, are arranged in oblique overlapping relation to form said boxes, the openings of said boxes facing the oncoming electron flow for easy access thereby.

7. The arrangement as defined in claim 6 wherein the cathode is cylindrical and each spade is elongated and has its inner portion curved substantially concentric to the cathode to narrow the box entrances.

References Cited in the file of this patent

UNITED STATES PATENTS

| | | |
|---|---|---|
| 2,141,322 | Thompson | Dec. 27, 1938 |
| 2,157,336 | Heising | May 9, 1939 |
| 2,173,252 | Fritz | Sept. 19, 1939 |
| 2,395,299 | Skellet | Feb. 19, 1946 |
| 2,477,008 | Rosen | July 26, 1949 |
| 2,563,807 | Alfven et al. | Aug. 14, 1951 |
| 2,591,997 | Backmark | Apr. 8, 1952 |